(12) United States Patent
Wehmeyer

(10) Patent No.: US 7,101,823 B2
(45) Date of Patent: *Sep. 5, 2006

(54) METHOD FOR PREPARING METAL CYANIDE CATALYST COMPLEXES USING PARTIALLY MISCIBLE COMPLEXING AGENTS

(75) Inventor: Richard M. Wehmeyer, Lake Jackson, TX (US)

(73) Assignee: United States of America, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/506,065

(22) PCT Filed: Mar. 17, 2003

(86) PCT No.: PCT/US03/07999

§ 371 (c)(1),
(2), (4) Date: Aug. 30, 2004

(87) PCT Pub. No.: WO03/080241

PCT Pub. Date: Oct. 2, 2003

(65) Prior Publication Data

US 2005/0065383 A1    Mar. 24, 2005

(51) Int. Cl.
  *B01J 31/00* (2006.01)
  *B01J 27/26* (2006.01)
(52) U.S. Cl. ....................... 502/159; 502/175
(58) Field of Classification Search .......... 502/175, 502/159
  See application file for complete search history.

(56) References Cited

U.S. PATENT DOCUMENTS

| 3,278,457 | A | 10/1966 | Milgrom |
|---|---|---|---|
| 3,278,458 | A | 10/1966 | Beiner |
| 3,278,459 | A | 10/1966 | Herold |
| 3,404,109 | A | 10/1968 | Milgrom |
| 3,427,256 | A | 2/1969 | Milgrom |
| 3,427,335 | A | 2/1969 | Herold |
| 4,472,560 | A | 9/1984 | Kuyper et al. |
| 4,477,589 | A | 10/1984 | van der Hulst et al. |
| 5,470,813 | A | 11/1995 | Le-Khac |
| 5,482,908 | A | 1/1996 | Le-Khac |
| 5,536,883 | A | 7/1996 | Le-Khac |
| 5,627,120 | A | 5/1997 | Le-Khac |
| 6,291,388 | B1 * | 9/2001 | Hofmann et al. ........... 502/154 |
| 6,323,375 | B1 | 11/2001 | Hofmann et al. |
| 6,355,848 | B1 | 3/2002 | Antons et al. |
| 6,429,342 | B1 | 8/2002 | Clement et al. |
| 6,552,163 | B1 | 4/2003 | Clement et al. |
| 6,627,575 | B1 * | 9/2003 | Kim et al. ................... 502/175 |
| 6,789,626 | B1 | 9/2004 | Wagg |

FOREIGN PATENT DOCUMENTS

| EP | 0 743 093 | 11/1996 |
|---|---|---|
| EP | 0 776 922 | 6/1997 |
| WO | WO 99/19063 | 4/1999 |
| WO | 01/04179 A1 | 1/2001 |
| WO | 01/04184 A1 * | 1/2001 |
| WO | WO 01/38421 | 5/2001 |

* cited by examiner

Primary Examiner—Elizabeth D. Wood

(57) ABSTRACT

Double metal cyanide catalysts (DMC) are complexed with complexing agents that are miscible in poly(propylene oxide) at higher temperatures and immiscible at lower temperatures. The complexing agent is a poly(ethylene oxide) polymer or a copolymer having a poly(ethylene oxide) block. The catalyst is easily removed from a polyether polyol.

4 Claims, No Drawings

METHOD FOR PREPARING METAL CYANIDE CATALYST COMPLEXES USING PARTIALLY MISCIBLE COMPLEXING AGENTS

BACKGROUND OF THE INVENTION

This invention relates to methods for making metal cyanide catalysts complexes and to methods for polymerizing alkylene oxides in the presence of a metal cyanide catalyst.

Polyethers are prepared in large commercial quantities through the polymerization of alkylene oxides such as propylene oxide and ethylene oxide. This polymerization reaction is usually conducted in the presence of an initiator compound and a catalyst. The initiator compound usually determines the functionality (number of hydroxyl groups per molecule of the polymer) and in some instances imparts some desired functionality. The catalyst is used to provide an economical rate of polymerization.

Metal cyanide complexes are becoming increasingly important alkylene oxide polymerization catalyst These complexes are often referred to as "double metal cyanide" or "DMC" catalysts, and are the subject of a number of patents, including, for example, U.S. Pat. Nos. 3,278,457, 3,278,458, 3,278,459, 3,404,109, 3,427,256, 3,427,334, 3,427,335 and 5,470,813, among many others. In some instances, these complexes provide the benefit of fast polymerization rates and narrow polydispersities. Additionally, these catalysts are associated with the production of polyethers having very low levels of monofunctional unsaturated compounds.

It is often desirable to remove residual DMC catalyst from polyethers. Various methods of accomplishing this have been developed, but the simplest method would be a simple filtration or phase separation. However, DMC catalysts that can be easily and effectively filtered from the polyol have not been commercially established.

Thus, it would be desirable to provide metal cyanide catalyst complex that exhibits good catalytic activity and can be simply and easily removed from a polyether polyol.

SUMMARY OF THE INVENTION

This invention is a metal cyanide catalyst complexed with a complexing agent that is miscible in a poly(propylene oxide) at an elevated temperature, but which is not miscible in the polypropylene oxide) at a lower temperature at which the poly(propylene oxide) is a liquid.

In another aspect, this invention is a metal cyanide catalyst complexed with an immiscible complexing agent comprising a poly(ethylene oxide) polymer or block copolymer having poly(ethylene oxide) blocks and blocks of another monomer or monomers, wherein the immiscible complexing agent is miscible in a poly(propylene oxide) at an elevated temperature, but which is not miscible in the poly(propylene oxide) at a lower temperature at which the poly(propylene oxide) is a liquid.

In another aspect, this invention is a process wherein a catalyst of any of the preceding aspects is mixed with an alkylene oxide and the resulting mixture subjected to conditions sufficient to polymerize the alkylene oxide to form a poly(alkylene oxide).

DETAILED DESCRIPTION OF THE INVENTION

The metal cyanide catalyst advantageously has the structure represented by the general structure:

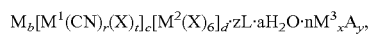

$M_b[M^1(CN)_r(X)_t]_c[M^2(X)_6]_d \cdot zL \cdot aH_2O \cdot nM^3{}_xA_y$, wherein M and $M^3$ are metal ions that form an insoluble precipitate with the $M^1(CN)_6$ and $M^2(X_2)_6$ ions, $M^1$ and $M^2$ are transition metal ions;

X represents a group other than $CN^-$ that coordinates with the $M^1$ ion;

r and t are numbers that represent the number of $CN^-$ and X groups, respectively, that are coordinated with the $M^1$ ion (r+t preferably equals 6 and t is most preferably zero);

L represents the completing agent;

A represents an anion that forms a salt with the $M^3$ ion;

b, c and d are numbers that reflect an electrostatically neutral complex, with the ratio of c:d being from about 50:50 to about 100:0;

x and y are numbers that reflect an electrostatically neutral salt of $M^3$ and A;

z, a and n are positive numbers (which may be fractions) indicating the relative quantities of the complexing agent, water, and $M^3{}_xA_y$, respectively, and a is zero or a positive number indicating the relative quantity of water molecules.

$M^1$ is preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred. M is preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M is more preferably $Zn^{+2}$, $Fe^{+2}$, $Co^{+2}$, $Ni^{+2}$, $La^{+3}$ and $Cr^{+3}$. M is most preferably $Zn^{+2}$.

Suitable anions A include $O^{-2}$, $OH.CO_3^{-2}$, $HCO_3^-$, $PO_4^{-3}$, $HPO_4^{-2}$, $H_2PO_4-$, as well as silicate, titanate and/or zirconate ions, a halide such as chloride and bromide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate.

c is preferably 5 or 6, most preferably 6; d is preferably 0 or 1, most preferably 0. b is usually 2 or 3, and is most typically 3. In most cases, c+d will equal six.

Preferred groups X include anions such as halide (especially chloride), hydroxide, sulfate, carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

Suitable metal cyanides (apart from the selection of the complexing agent L) are described, for example, in U.S. Pat. Nos. 3,278,457, 3,278,458, 3,278,459, 3,404,109, 3,427,256, 3,427,334, 3,427,335 and 5,470,813, and copending application Ser. Nos. 09/574,924, 09/574,923 and 09/574,925, all filed May 19, 2000, all incorporated herein by reference. All or part of L is the immiscible complexing agent.

L is miscible in a 2000 $M_n$ poly(propylene oxide) homopolymer diol at some elevated temperature, but immiscible in that poly(propylene oxide) diol at some lower temperature at which the poly(propylene oxide) is a liquid. The elevated temperature is preferably at least 50° C., more preferably at least 80° C., even more preferably at least 100° C. and especially at least 120° C. L is preferably immiscible in that poly(propylene oxide) at 25° C., more preferably at 50° C., even more preferably at 80° C. and most preferably at 100° C.

Suitable complexing agents L include materials having a melting temperature between 25° C. and 150° C., preferably from 40° C. to 120° C., especially from about 60° C. to about 110° C. An example of such a complexing agent L is a poly(ethylene oxide) having a melting temperature of from 40–65° C. Another suitable complexing agent L is a block copolymer containing poly(oxyethylene) blocks and one or more blocks of another polymer, preferably having a melting temperature within the aforementioned ranges. An example of such as block copolymer is one having a poly(oxyethylene block) and a polyether block of a different monomer or monomers (such as propylene oxide, butylene oxide, tetramethylene oxide, mixtures of them or mixtures of them with ethylene oxide). Another example of such a block copolymer is one of an olefin, such as ethylene and/or propylene (preferably ethylene) with ethylene oxide. Other examples are block copolymers having a polyester (such as poly-$\epsilon$-caprolactone) or poly(vinyl aromatic) (such as polystyrene) block. In the block copolymers, the oxyethylene blocks have a weight of 100 daltons or more, preferably 150–10,000 daltons, especially 150–3000 daltons. A particularly suitable complexing agent L is a block copolymer having a polyethylene or polycpropylene block having a weight of 150–2000 daltons and a poly(ethylene oxide) block having a molecular weight of about 150–2000 daltons.

The metal cyanide catalyst can be made by reacting a solution of a metal cyanide compound (i.e., the acid or its corresponding alkali metal or ammonium salt) with a soluble metal salt, an insoluble metal salt or a metal. The metal cyanide catalyst precipitates. The precipitated catalyst can be isolated (by, for example, filtration) and then washed one or more times with the complexing agent L, or a solution of L in water or an organic solvent such as methanol. The catalyst then can be dried and recovered.

A preferred method of making the catalyst is to form the catalyst as a slurry in an excess of the complexing agent L, or in a mixture of the complexing agent L and a non-volatile initiator compound and/or a polyether. Methods of preparing metal cyanide catalysts directly as a slurry in an initiator compound are described in copending application Ser. No. 09/574,847, filed May 19, 2000, provisional application 60/365,666, filed Mar. 19, 2002 entitled METHOD FOR PREPARING METAL CYANIDE CATALYSIS USING INSOLUBLE METAL SALTS, and provisional application 60/366,759, filed May 21, 2002 entitled Method for Preparing Metal Cyanide Catalysts Using Zero Valent Metals both incorporated herein by reference. In these slurry processes, it is preferred to use an acidic alkali metal cyanide compound as a starting material, and react that with a metal, a soluble salt of the metal and/or an insoluble salt of the metal. The reaction is conducted in water or an organic solvent medium, or, if L is a liquid at the temperature of the reaction, L. If the reaction is conducted in water or an organic solvent medium, the resulting slurry can be mixed with the complexing agent L (or mixture thereof) and then stripped if desired to remove water and/or one or more components of the solvent medium.

The catalyst complex of the invention is useful to polymerize alkylene oxides to make polyethers. In general the process includes mixing a catalytically effective amount of the catalyst with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time. An amount of catalyst sufficient to provide from about 5 to about 100,000 parts by weight metal cyanide catalyst (calculated as $M_b[M^1(CN)_r(X)_t]_c[M^2(X)_6]_d \cdot nM^3_xA_y$, exclusive of any associated water and initiator) per million parts combined weight of alkylene oxide, and initiator and comonomers, if present. More preferred catalyst levels are from about 20, especially from about 30, to about 50,000, more preferably to about 10,000 ppm, even more preferably to about 1500 ppm, on the same basis. Somewhat higher catalyst levels can be used, compared to most other DMC catalysts, due to the relative ease of removal of the catalysts of the invention.

Among the alkylene oxides that can be polymerized with the catalyst complex of the invention are ethylene oxide, propylene oxide, 1,2-butylene oxide, styrene oxide, epichlorohydrin and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 70 weight %, especially up to 85 weight %, propylene oxide and up to about 30, especially 15, weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 6,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The product polymer is preferably one in which the complexing agent L exhibits temperature-dependent miscibility, i.e. it is miscible in the product at a higher temperature but immiscible in the product at some lower temperature at which the product is a liquid. Most preferred product polymers are homopolymers of propylene oxide, random copolymers of propylene oxide and a small quantity (up to 30% by weight, especially up to about 15% by weight) of ethylene oxide, or a block copolymer of propylene oxide (or random copolymer as above) and ethylene oxide or other material.

The polymerization reaction typically proceeds well at temperatures from about 25 to about 150° C. or more, preferably from about 80–130° C. A convenient polymerization technique involves charging the catalyst to a reactor and pressurizing the reactor with the alkylene oxide. An initiator compound is generally added prior to the introduction of the monomers. Polymerization proceeds after a short induction period as indicated by a loss of pressure in the reactor. Once the polymerization has begun, additional alkylene oxide is conveniently fed to the reactor on demand until enough alkylene oxide has been added to produce a polymer of the desired equivalent weight. Short induction periods are often seen.

Another convenient polymerization technique is a continuous method. In such continuous processes, the activated catalyst is continuously fed into a continuous reactor such as a continuously stirred tank reactor (CSTR) or a tubular reactor. A feed of alkylene oxide is introduced into the reactor and the product continuously removed. Initiator can be added continuously or intermittently, with the catalyst (such as in the form of a catalyst slurry in the initiator) or as a separate stream. Those catalysts exhibiting a particularly short induction period, such as less than 15 minutes, preferably less than 10 minutes, and especially less than 5 minutes, are particularly suitable for use in processes where the catalyst is added continuously.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.025 meq/g, preferably from about 0.005 to 0.02 meq/g.

During the polymerization reaction, the temperature is preferably high enough that the catalyst disperses in the forming polymer. This allows for excellent reaction efficiencies. In the preferred case where the catalyst has temperature-dependent miscibility in the polymer, the immiscible complexing agent becomes immiscible as the polymer is removed from the reaction vessel and cooled, and will phase separate or precipitate from the product. The metal catalyst separates with the complexing agent. Thus, by decanting or filtering (or other method of physical separation), the metal cyanide catalyst is quickly and easily removed from the product.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated. Catalyst loadings are calculated from the starting materials and ignoring any associated water and initiator.

EXAMPLE 1

$K_3Co(CN)_6$ (FW 332.35, 20.0 g, 60.18 mmol is dissolved in deionized water (51.6 g). A solution of 96% $H_2SO_4$ (18.44 g, approximately 180.5 mmol $H_2SO_4$) is added slowly dropwise over about 10 minutes to the stirred solution of $K_3Co(CN)_6$. A light yellow solution is obtained, which is cooled to 40° C. with stirring. Methanol (80 g) is added to the solution over 10 minutes. During the addition, $K_2SO_4$ and/or $KHSO_4$ precipitates as a granular white solid. The resultant slurry is stirred for 5–10 minutes while cooling to 35° C. The slurry is placed in an ice water bath, stirred for 30 minutes, and vacuum filtered to remove the precipitate. The salt cake is rinsed with methanol (18 g total) to aid in deliquoring; the rinses are combined with the filtrate. The filtrate is a light yellow, clear solution weighing 177.47 g, containing a maximum of 7.39% $H_3Co(CN)_6$.

8.85 g of the $H_3Co(CN)_6$ solution (which contains about 2.7–3.0 mmol $H_3Co(CN)_6$), are added dropwise over 30 minutes with stirring to a slurry of ZnO (0.73 g, 9.0 mmol), $ZnCl_2$ (0.20 g, 1.5 mmol) and polyethylene-block-poly(ethylene glycol) copolymer ($M_n$ total 875, PE block 700, PEG block 175, 5.18 g) in methanol (100 g). A small quantity of methanol is used to rinse the equipment. Most of the ZnO disappears as it reacts during the addition. The slurry is stirred for 10 minutes after the addition is completed. Finely divided particles of DMC catalyst are suspended in a liquid phase. Some unreacted ZnO remains.

Another 45 g of the polyethylene-block-poly(ethylene glycol) copolymer is then added. Additional methanol (80 g) is added to improve mixing. The slurry is heated at atmospheric pressure to 80° C., forming a thick, waxy material. Additional methanol is added to thin the mixture. The mixture is then heated at 80° C. under slight vacuum to remove part of the methanol. A viscous, semi-solid material is obtained. This is dried under 15–30 Torr (2–4 kPa) at 70° C. to form a flaky solid. The material is heated further, to 110–120° C. under 15–30 Torr (2–4 kPa) vacuum, at which temperature it melts and devolitalizes. The product is cooled and forms a hard waxy solid. The final product weighs 50.54 g and contains about 3.07% dispersed DMC catalyst particles.

EXAMPLE 2

$K_3Co(CN)_6$ (FW 332.35, 20.0 g, 60.18 mmol) is dissolved in deionized water (35 g). A solution of 96% $H_2SO_4$ (17.82 g, approximately 180 mmol $H_2SO_4$) is added slowly dropwise over about 15 minutes to the stirred solution of $K_3Co(CN)_6$. A light yellow solution is obtained, which is cooled to 40° C. with stirring. Methanol is added to the solution over 10 minutes. During the addition, $K_2SO_4$ and/or $KHSO_4$ precipitates as a granular white solid. The resultant slurry is stirred for 5–10 minutes while cooling to 35° C. The slurry is placed in an ice water bath, stirred for 30 minutes, and vacuum filtered to remove the precipitate. The salt cake is rinsed with methanol (18 g total) to aid in deliquoring; the rinses are combined with the filtrate. The filtrate is a light yellow, clear solution weighing 494 g, containing a maximum of 2.66% $H_3Co(CN)_6$.

24.59 g of the $H_3Co(CN)_6$ solution (which contains about 2.7–3.0 mmol $H_3Co(CN)_6$), are added dropwise over 35 minutes with stirring to a solution of $ZnCl_2$ (1.23 g, 9 mmol) and polyethylene oxide (diol, 3350 $M_w$, 1.60 g) in methanol (15 g). A small quantity of methanol is used to rinse the equipment. The slurry is stirred for 25 minutes after the addition is completed. Finely divided particles of DMC catalyst are suspended in a liquid phase.

The slurry is heated under vacuum at temperatures increasing to 80° C. and vacuum increasing to 15–30 Torr (2–4 pa). The resulting solid is dried overnight at 50° C./15–30 Torr (2–4 kPa) to produce a clear, waxy solid. This solid is then further dried for about 5 hours at 90° C./15–30 Torr (2–4 pKa). The final product weighs 3.58 g and contains about 43.4% dispersed DMC catalyst particles.

EXAMPLE 3

24.59 g of the $H_3Co(CN)_6$ solution from example 2 (which contains about 2.7–3.0 mmol $H_3Co(CN)_6$), are added dropwise over 35 minutes with stirring to a solution of $ZnCl_2$ (1.23 g, 9 mmol) and polyethylene oxide (diol, 3350 $M_w$, 5.0 g) in methanol (20.6 g). A small quantity of methanol is used to rinse the equipment. The mixture is heated slightly to dissolve the polyethylene oxide. The slurry is stirred for 10 minutes after the addition is completed. Finely divided particles of DMC catalyst are suspended in a liquid phase. An additional 71.6 grams of the polyethylene oxide are then stirred in.

The slurry is heated under vacuum at temperatures increasing to 80° C. and vacuum increasing to 15–30 Torr (2–4 pKa). The resulting solid (which melts at 75–80° C.) weighs about 77.6 g and contains about 2.0% dispersed DMC catalyst particles.

EXAMPLE 4

$K_3Co(CN)_6$ (FW 332.35, 20.0 g, 60.18 mmol) is dissolved in deionized water (46.6 g) and heated to 45° C. A solution of 96% $H_2SO_4$ (18.44 g, approximately 180.5 mmol $H_2SO_4$) is added slowly dropwise over about 10 minutes to the stirred solution of $K_3Co(CN)_6$. A light yellow solution is obtained, which is cooled to about 45° C. with stirring. Methanol (200 g) is added to the solution over 5 minutes. During the addition, $K_2SO_4$ and/or $KHSO_4$ precipitates as a granular white solid. The resultant slurry is stirred for 50 minutes while cooling toward room temperature. The slurry is placed in an ice water bath, stirred for 30 minutes, and vacuum filtered at 15° C. to remove the precipitate. The salt cake is rinsed with methanol (18 g total) to aid in deliquoring; the rinses are combined with the filtrate. The filtrate is a light yellow, clear solution weighing 290.5 g, containing a maximum of 4.52 wt.-% $H_3Co(CN)_6$.

143.63 g of the $H_3Co(CN)_6$ solution (which contains about 29.75 mmol $H_3Co(CN)_6$), are added dropwise over 125 minutes with stirring to a slurry of ZnO (8.73 g, 107.2 mmol) in methanol. A small quantity of methanol is used to rinse the equipment. Most of the ZnO disappears as it reacts during the addition. The slurry is stirred for about a day after the addition is completed. Some unreacted ZnO remains. About 145.49 grams of DMC slurry are obtained.

A slurry of polyethylene-block-poly(ethylene glycol) copolymer ($M_n$ total 1400, PE block 700, PEG block 700, 90.40 g) in toluene (904 g) is heated to 80° C. with stirring at atmospheric pressure in a 2 stripping flask to dissolve the copolymer. The solution is then cooled to 60° C. The DMC slurry is added in several small portions. After each portion of DMC slurry is added, the methanol is distilled at 60° C./up to about 125 Torr (~17 kPa) vacuum and slight nitrogen sweep. Some water/toluene azeotrope and possibly some toluene is also removed during these distillation steps. Following the final addition of DMC slurry, the bulk of methanol is removed at 60° C./~125 Torr (~17 kPa) vacuum, and then the temperature and vacuum are gradually increased to 80° C. and 15–30 Torr (2–4 kPa) for 160 minutes. At this point, 106.97 grams of DMC/copolymer slurry in mainly toluene remain. 104.19 g of this are transferred into a glass bottle and heated at 120° C./~125 Torr (~17 pKa) vacuum with slight nitrogen sweep for 5–6 hours. The temperature and vacuum are then increased to 150° C. 15–30 Torr (2–4 kPa) (no nitrogen sweep) for 2 hours. An opaque, waxy solid is obtained when the product is cooled to room temperature, having a mass of 95.12 g and containing about 4.87 wt.-% of the DMC catalyst.

A glass vial is charged with 0.0037 g of the solid catalyst slurry, 0.1239 g of Voranol 2070™ polyol (a 700 molecular weight poly(propylene oxide) triol), and 0.5823 g of propylene oxide, sealed and heated to 90° C. for 21 hours. The progress of the reaction is followed visually. 100% of the propylene oxide is converted to polymer after 21 hours of polymerization. The final reaction product is visually clear at 110° C., indicating that at that temperature the catalyst complex is miscible in the product poly(propylene oxide). However, upon cooling to 90° C., the product becomes opaque as the catalyst complex phase separates. The phase-separated catalyst is then removable by filtration and/or centrifugation techniques.

What is claimed is:

1. A double metal cyanide catalyst complexed with a complexing agent, wherein the complexing agent is a block copolymer having a poly(ethylene oxide) block and a block of polyethylene or polycpropylene.

2. The double metal cyanide catalyst of claim 1, wherein the poly(ethylene oxide) block has a weight of 150–2000 daltons and the polyethylene or polycpropylene block has a weight of 150–2000 daltons.

3. The double metal cyanide catalyst of claim 2 wherein the metal cyanide is a zinc hexacyanocobaltate.

4. A double metal cyanide catalyst of claim 3 wherein the block copolymer has a melting temperature between 25° C. and 150° C.

* * * * *